United States Patent
Tselesin

(10) Patent No.: US 6,273,082 B1
(45) Date of Patent: *Aug. 14, 2001

(54) ABRASIVE CUTTING TOOL

(75) Inventor: Naum T. Tselesin, Atlanta, GA (US)

(73) Assignee: Ultimate Abrasive Systems, L.L.C., Atlanta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/055,217

(22) Filed: Apr. 6, 1998

Related U.S. Application Data

(60) Division of application No. 08/480,715, filed on Jun. 7, 1995, which is a continuation-in-part of application No. 08/024,649, filed on Mar. 1, 1993, now abandoned, which is a continuation-in-part of application No. 07/741,678, filed on Aug. 7, 1991, now Pat. No. 5,190,568, which is a continuation-in-part of application No. 07/712,989, filed on Jun. 10, 1991, now abandoned.

(51) Int. Cl.$^7$ ........................................ B24D 5/08
(52) U.S. Cl. ........................ 125/15; 451/542; 451/546
(58) Field of Search ...................... 125/15; 451/542, 451/543, 546; 51/293

(56) References Cited

U.S. PATENT DOCUMENTS

| | | | |
|---|---|---|---|
| 2,268,663 | 1/1942 | Kuzmick | 51/206 |
| 2,811,960 | 11/1957 | Fessel | 125/15 |

(List continued on next page.)

FOREIGN PATENT DOCUMENTS

| | | | |
|---|---|---|---|
| 2032111U | 8/1989 | (CN) | |
| 2540204 | 7/1977 | (DE) | 125/15 |
| 0 086 086 | 8/1983 | (EP) | |
| 0 527 344 A2 | 2/1993 | (EP) | |
| A-2091496 | 1/1972 | (FR) | |
| 580867 | 9/1946 | (GB) | |
| 1167606 | 10/1969 | (GB) | |

(List continued on next page.)

OTHER PUBLICATIONS

"Fundamentals of Designing and Technology of Manufacturing Abrasive and Diamond Tools," Edited by Yu M. Kevalchuk, Moscow, Mashinostroenie Publishing House, 1984, pp. 172–174, w/English translation of Official Action issued by Russian Patent Office indicating relevance of reference.

*Primary Examiner*—Robert A. Rose
(74) *Attorney, Agent, or Firm*—Finnegan, Henderson, Farabow, Garrett & Dunner, L.L.P.

(57) ABSTRACT

Structurally independent cutting members are formed with abrasive material comprising a plurality of particles protruding through a surface of the retaining material comprising a mesh material for durable cutting members; and, the structurally independent cutting members are selectively continuous or discontinuous and spatially mounted along the working edge of a core. Some of the cutting members or portions of the cutting members are arranged for stock removal, and some are arranged for gauge keeping. Since the individual portions of the cutting portions are separate, more stock removal portions can be included, with fewer gauge keeping portions as may be required. The structurally independent cutting members may have a variety of profile shapes, such as contoured configurations to provide stock removal using high pressure cutting forces applied normal to the cutting face of the workpiece and gauge keeping functions using low pressure cutting forces applied laterally to the cutting face to the workpiece.

29 Claims, 4 Drawing Sheets

U.S. PATENT DOCUMENTS

| | | | |
|---|---|---|---|
| 3,127,715 | 4/1964 | Christensen | 51/206 |
| 3,176,675 | 4/1965 | Bomba | 125/15 |
| 3,353,526 | 11/1967 | Daem | 125/15 |
| 3,537,491 | 11/1970 | Kolesh | 143/133 |
| 3,742,655 | 7/1973 | Oliver | 51/356 |
| 4,481,016 * | 11/1984 | Campbell et al. | 51/295 |
| 4,668,248 | 5/1987 | Dettelbach et al. | 51/293 |
| 4,679,541 | 7/1987 | Fish | 125/51 |
| 4,793,828 * | 12/1988 | Burnand | 51/293 |
| 5,049,165 | 9/1991 | Tselesin | 51/295 |
| 5,092,910 | 3/1992 | DeKok et al. | 51/295 |
| 5,215,072 * | 6/1993 | Scott | 125/21 |

FOREIGN PATENT DOCUMENTS

| | | | |
|---|---|---|---|
| 35-6296 | 6/1960 | (JP) . | |
| 53-69994 | 6/1978 | (JP) . | |
| 54-82788 | 7/1979 | (JP) . | |
| 55-58983 | 5/1980 | (JP) . | |
| 56-116166 | 9/1981 | (JP) . | |
| 57-132973 | 8/1982 | (JP) . | |
| 040268 | 3/1983 | (JP) | 125/15 |
| 59-115163 | 7/1984 | (JP) . | |
| 59-191256 | 12/1984 | (JP) . | |
| 60-92406 | 5/1985 | (JP) . | |
| 0142076 * | 6/1986 | (JP) | 125/15 |
| 62-181363 | 11/1987 | (JP) . | |
| 62-255069 | 11/1987 | (JP) . | |
| 62-264869 | 11/1987 | (JP) . | |
| 63-34075 | 2/1988 | (JP) . | |
| 63-34077 A | 2/1988 | (JP) . | |
| 1-205979 | 8/1989 | (JP) . | |
| A-0580867 | 9/1946 | (WO) . | |
| A-0611202 | 5/1979 | (WO) . | |
| U-8804035 | 3/1988 | (WO) . | |
| U-9110796 | 8/1991 | (WO) . | |
| 94/1357 | 12/1994 | (ZA) . | |

* cited by examiner

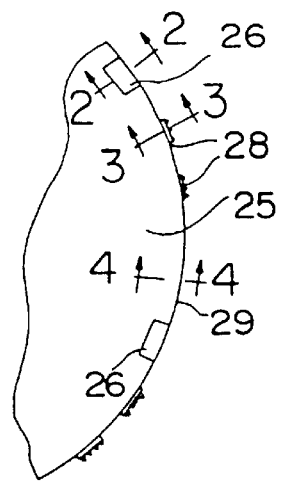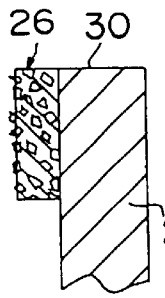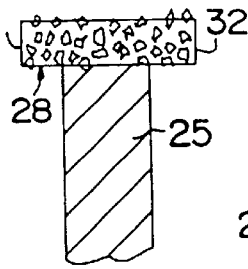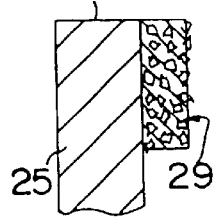
FIG. 1    FIG. 2    FIG. 3    FIG. 4
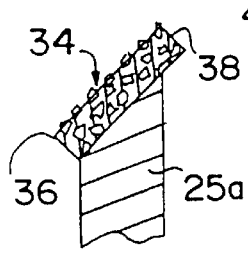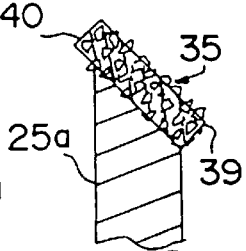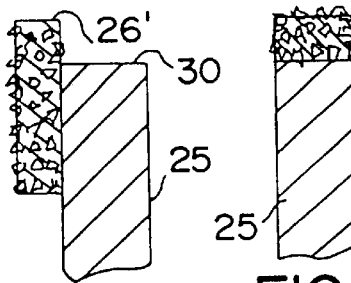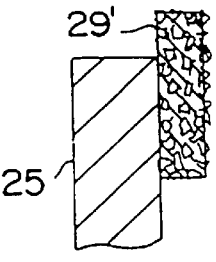
FIG. 5    FIG. 6    FIG. 2A    FIG. 3A    FIG. 4A
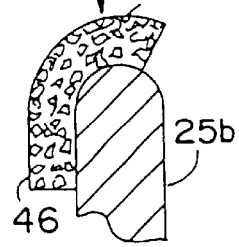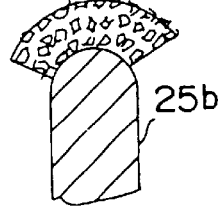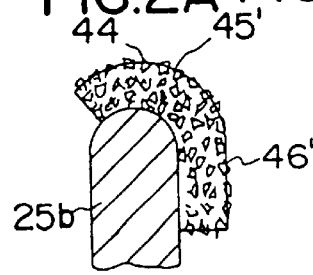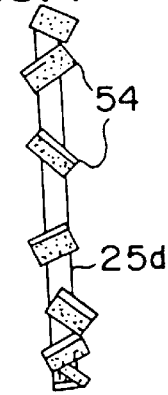
FIG. 7    FIG. 8    FIG. 9    FIG. 13
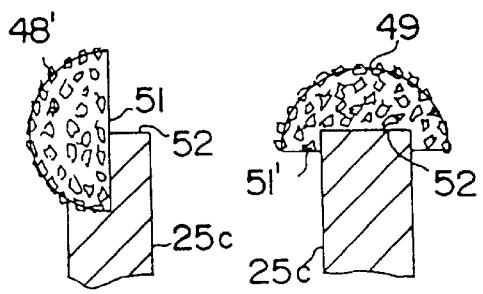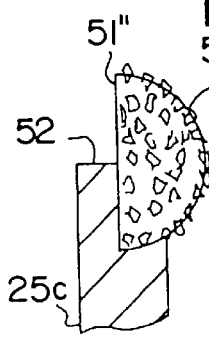
FIG. 10    FIG. 11    FIG. 12

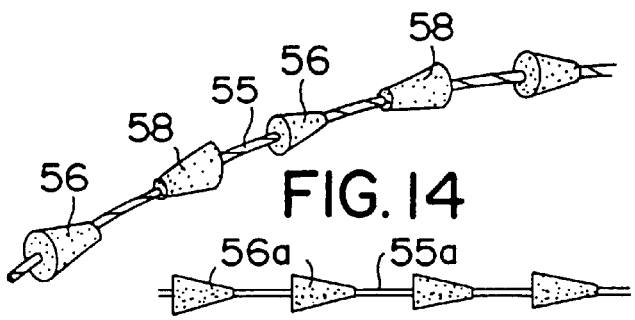
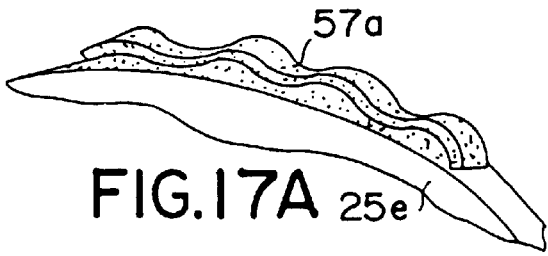
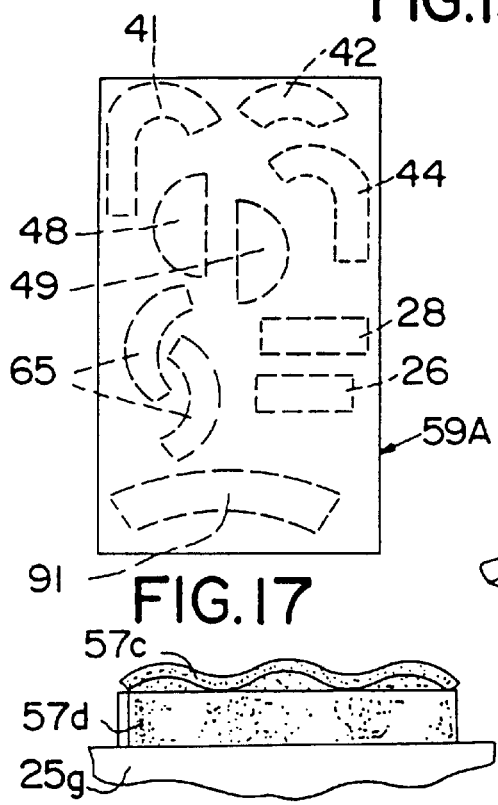
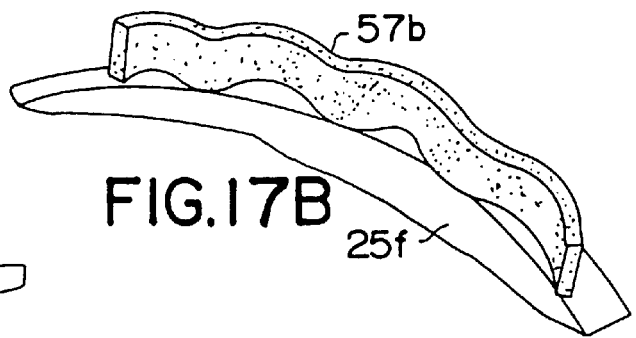
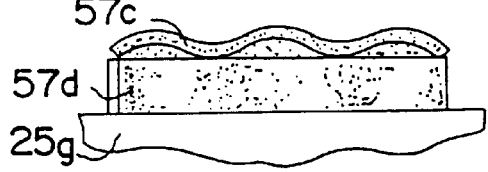
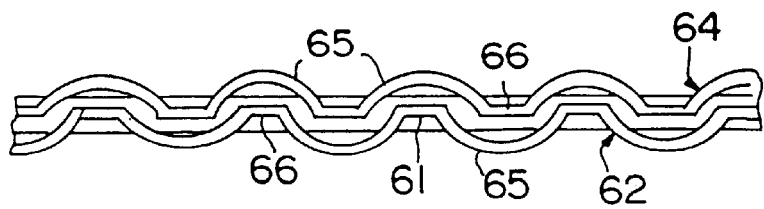

ABRASIVE CUTTING TOOL

CROSS REFERENCE TO RELATED APPLICATIONS

This is a division of application Ser. No. 08/480,715, filed Jun. 7, 1995 which is a CIP of Ser. No. 08/024,649, filed Mar. 1, 1993, now abandoned, which is a CIP of Ser. No. 07/741,678, filed Aug. 7, 1991, now U.S. Pat. No. 5,190,568, which is a CIP of Ser. No. 07/712,989, filed Jun. 10, 1991, now abandoned.

BACKGROUND OF THE INVENTION

It is well known in the abrasive cutting arts related to such materials as concrete, stone, ceramic, glass, composite materials and the like to utilize cores, such as disks for circular saws and disk grinders, cylinders for core drills, bands for band saws and belt grinders, articulating links for a saw chain, solid rectangular metal strips for reciprocating saws, flexible cable for wire-type saws; and to randomly affix a plurality of diamonds or other hard abrasive particles directly to specific areas of the cores, or affix a plurality of cutting members to specific areas of the cores.

1. Field of the Invention

This invention relates generally to cutting tools, and is more particularly concerned with cutting tools that utilize abrasive particles to effect the cutting action.

2. Description of the Prior Art

The prior art cutting members typically comprise a matrix material having a plurality of diamonds or other hard abrasive particles randomly or selectively embedded therein. It is also known to make kerf cutting portions of a core, or the cutting members affixed to the kerf cutting portions of a core wider than the body of the core so the body of the core will not bind within the kerf as the cutting progresses. It is further known that cutting efficiency is improved substantially if cutting debris can be rapidly removed from the work material as cutting progresses. Prior art abrasive coated cores or prior art cutting members, however, tend to wear rapidly and in such fashion that the width of the cutting portion of the tool, or the cutting members affixed to the cutting portion of the tool are reduced as the cutting progresses, preventing rapid removal of cutting debris and allowing the core body to interfere with the sides of the kerf. Both conditions lead to reduced cutting efficiency and rapid failure of the cutting tool while expensive diamonds or other abrasive particles remain unused.

Prior art efforts at resolving problems associated with cutting members have included variations in the wear characteristics of the matrix material used to consolidate the cutting members and using a greater number of hard particles embedded in the sides of the cutting member than in the middle so that the sides will wear longer to maintain the desired kerf width. Also, various shapes and profiles of cutting members within their structural limits have been devised in an effort to facilitate rapid removal of cutting debris or improve the wear pattern.

Efforts to further improve cutting characteristics of abrasive cutting tools based upon prior art technology have been limited by lack of an inherent structural integrity of the cutting members thereby preventing the use of efficiency enhanced configurations of the cutting members; the lack of debris clearance immediately surrounding each abrasive particle until the matrix material has been worn away thereby leaving the cutting members vulnerable to abrasive particle loss while substantial cutting value remains; non uniform distribution of hard particles throughout the matrix material or on the surface of the core material thereby causing loss of cutting value by over concentration of hard particles in a small area, or by premature loss of hard particles as their mutual support is eroded. As a result, the above mentioned efforts of the prior art technology to improve the cutting characteristics of abrasive cutting tools have been limited.

SUMMARY OF THE INVENTION

The present invention provides for structurally independent cutting members to be mounted on a core for use as a cutting tool, or for structurally independent cutting tools having a composite cutting portion and a composite non-cutting core portion, or for composite, structurally independent cutting tools, the cutting members or composite cutting tools. By using a cellular or mesh-type material applied in a way described in U.S. Pat. Nos. 4,925,457, 5,049,165, and 5,092,910 for locating, positioning, placing and supporting hard particles within the material's structure, as well as using the mesh-type material as a structural component, design latitude is expanded to provide for enhanced cutting members or cutting portion configurations. Maximum productivity of the cut and/or cutting life are obtained from the hard abrasive particles during cutting action before they are lost. Maximum initial debris clearance adjacent to each hard particle is assured by the spacing and configuration of the cutting members which can provide ample channels for removal of cutting debris, and to supply and remove coolant when it is used. The cutting members or core configurations in accordance with the present invention may comprise a plurality of mesh layers, shapes and locations to achieve the effect of one cutting member having both high pressure and low pressure cutting forces to correspond, respectively, to applied normal and lateral cutting forces. The total power for driving the cutting tool is reduced, and channels for providing coolant and removing coolant and debris are improved. A cutting tool of the present invention can be produced at reduced costs, and the tool is reliable, exhibits good performance, is safe, and is compatible with the requirements of a user.

BRIEF DESCRIPTION OF THE DRAWINGS

These and other features and advantages of the present invention will become apparent from consideration of the following specification when taken in conjunction with the accompanying drawings in which:

FIG. 1 is a fragmentary side elevation view showing a circular saw having cutting members mounted thereon made in accordance with the present invention;

FIG. 2 is an enlarged cross-sectional view taken substantially along the line 2—2 in FIG. 1;

FIG. 2A is similar to FIG. 2, but showing a modified form thereof;

FIG. 3 is a cross-sectional view taken substantially along the line 3—3 in FIG. 1;

FIG. 3A is similar to FIG. 3, but showing a modified form thereof;

FIG. 4 is an enlarged cross-sectional view taken substantially along the line 4—4 in FIG. 1;

FIG. 4A is similar to FIG. 4, but showing a modified form thereof;

FIGS. 5 and 6 are cross-sectional views similar to FIGS. 2 and 4, but showing a modified form of the cutting member;

FIGS. 7 to 9 are similar to FIGS. 2 to 4, but show another modified form of the cutting member;

FIGS. 10 to 12 are similar to FIGS. 2 to 4, but show another modified form of the cutting member;

FIG. 13 is a top plan view showing a circular saw having a different form of the cutting members mounted thereon;

FIGS. 14 is a perspective view showing a cable saw made in accordance with the present invention;

FIG. 15 is a side elevation view showing a modified form of the saw shown in FIG. 14;

FIG. 16 is a perspective view showing a block of contoured material as disclosed in U.S. Pat. No. 5,190,568.

FIG. 17 is a plan view of a block similar to that shown in FIG. 16, but of flat configuration and illustrates shapes to be cut from the block;

FIGS. 17A, 17B and 17C illustrate cutting members formed from pieces cut from the block shown in FIG. 16;

FIG. 18 is an elevation view showing the cutting edge of a tool made in accordance with the present invention;

DETAILED DESCRIPTION OF THE EMBODIMENTS

Figure 19:
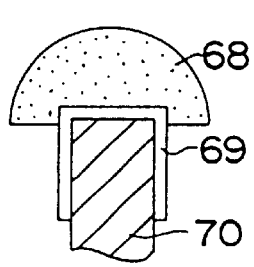
FIG. 19 is a front elevation view of a cutting segment similar to that of FIG. 11 and made in accordance with the present invention but adapted for subsequent mounting on a core.

Referring now more particularly to the drawings, and to those embodiments of the invention here presented by way of illustration, it should be understood that the hard-particle-containing material utilized in the present invention is a material, such as that disclosed in U.S Pat. Nos. 4,925,457, 5,092,910 and 5,049,165. The material may be made in accordance with the teachings in U.S. Pat. No. 5,203,880 and, the material may conform to that disclosed and claimed in Pat. No. 5,190,568.

The present invention relates to novel tools utilizing the mesh material disclosed in these patents, which can be an integral part of the composite abrasive material, or the composite structural material. The success of utilizing a mesh material is directly associated with the concentration and uniform distribution of abrasive particles within the openings of the mesh material and if it remains as an integral part of the composite structural material, the retention of the abrasive particles within the openings of this mesh material and the structural integrity of the composite. The higher the degree of adherence to these characteristics, the more successful will be the utilization of these composite materials in the present invention.

FIG. 1 of the drawings shows a circular saw including a core 25 having a plurality of cutting members fixed to its periphery. Those skilled in the art will understand that it is well known in the art to fix cutting members to the periphery of a core 25; but, the cutting members themselves comprise profiles which are in general unique and exhibit the desired characteristics during performance when using these materials.

From FIG. 1 it will be seen that there are three different profiles of the cutting member, the profiles being designated 26, 28 and 29, which are shown respectively in FIGS. 2, 3 and 4. It will be observed in FIG. 1 that there are two successive members 28, and this will be further discussed below.

The cutting member 26 is secured to one side of the core 25, and is substantially aligned with the peripheral edge 30 of the core 25. As a result, the member 26 will cut only the side of the kerf, acting as a low pressure gauge keeping member. The cutting member 29 is secured to the opposite side of the core 25, and is essentially the mirror image of member 26. Thus, member 29 cuts only the opposite side of the kerf. Also, the members 26 and 29 provide protection against wear of the core 25.

The cutting member 28 is mounted on the peripheral edge 30 of the core 25, and is used for high pressure stock removal, acting at the bottom of the kerf. The member 28 has a width equal to or less than the sum of the widths of the member 26, the core 25 and the member 29. The cutting member 28 will cut material to provide a kerf; and, as the core 25 moves into the kerf, the members 26 and 29 act as low pressure gauge keeping members to maintain the kerf width, and to assist in protecting the ends 31 and 32 of the high pressure stock removal member 28.

Since the cutting member 28 is used for high pressure stock removal, the number of members 28 placed on the core 25 depends more upon the structure of the mesh material, than the number of members 26 and 29 placed on the core 25. Thus, as is shown in FIG. 1, there is a member 26, followed by two of the members 28, then one member 29, and the sequence will be repeated throughout the periphery of the core 25. A variation of this design is shown in FIGS. 2A, 3A, and 4A. The cutting member 28' has a width equal (or about equal) to the width of the core 25, and the cutting members 26' and 29' cover the sides of cutting member 28'. This design provides extra protection against side wearing. Members 26, 26' and 29, 29' may comprise abrasive particles having different specifications and concentrations from members 28 and 28'. In most cases members 29, 29' and 26, 26' are composed of smaller abrasive particles and are present in greater concentrations than in members 28, 28'. Since there is virtually no direct feed force applied to the sides of the kerf this allows a certain degree of cutting action to take place without imposing high frictional forces, as well as providing smoother surfaces on the cut workpiece. The unique characteristics of the mesh material allow for such a differentiation between cutting functions to be practically achieved in the construction of an abrasive cutting tool.

Though the core 25 shown in FIG. 1 is circular, it should be understood that, using other cores, the use and function of the cutting members 26, 28 and 29 will be the same. Thus, one might place the cutting members along the working edge of a band saw, or along the working edge of a reciprocating saw, or even along the working edge of a hole drill. Reference herein to a core are to be understood in a broad sense.

Considering the operation of the device shown in FIGS. 1 to 4, it will be understood that there will be a plurality of high pressure stock removal members 28, 28' distributed along the periphery of the core 25, the members 28, 28' being formed of a mesh material to locate or position and to retain hard particles on and/or within a bonding matrix material along with other abrasive materials, wherein the plurality of abrasive particles are distributed tightly and uniformly by the mesh material. It should be understood here that the mesh material, which may be metallic, ceramic, polymeric and the like, after being used to position the abrasive particles may be partially or completely removed either physically prior to sintering the matrix material, or dissolved or evaporated at the temperatures used to sinter the matrix material, leaving the abrasive particles uniformly distributed within the bonding matrix with altered structural and wear characteristics of the final composite.

The usual deterioration or wearing of a cutting member is by rounding of the edges and corners of the cutting member. The use of a mesh material retards loss of hard particles in these areas. The gauge members 26, 26' and 29, 29' assist in maintaining the full kerf while members 28, 28' primarily perform the stock removal function. Since the wear and structural characteristics of both types of members are essentially the same at the corners of the kerf intersection, it is advantageous that both cutting members contain mesh material at this juncture to reduce the rounding effect. Depending upon the material being cut, however, it may be advantageous to eliminate the mesh material from the cutting member in the central area of cutting member 28. Between each of the members 26, 28 and 29 or 26' 28' and 29', there is a space which allows rapid removal of debris, and allows for the free flow of coolant when used, further reducing the rounding wear at the edges and corners of the members. The cutting members 28, 28 and 29 can be placed separately on a designated tooth of the core 25. Depending upon the material being cut and the type of tool being used, it may be advantageous to remove the mesh material from at least two layers of bonding matrix on either or both sides of cutting members 28, 28' while leaving the mesh material in at least one layer of bonding matrix in the center of cutting members 28, 28' to act as a structural component, as well as a wear modifier.

In FIGS. 5 and 6 of the drawings, the core is designated as 25a, and the cutting members are designated as 34 and 35. As in the previously described embodiment, the members 34 and 35 are distributed along the working periphery of the core 25a.

One form of prior art cutting member is arranged so that the outside edges cut first, to yield a V-shape at the bottom of the kerf. The purpose of the V-shape is to help keep the cutting device running. true, and straight in the kerf. The arrangement shown in FIGS. 5 and 6 is similar, but the V-shape is formed by two separated pieces. The cutting member 34 is angled so the outer ends 36 and 38, will act largely as a gauge keeping surface while the angled surface between the outer ends will be used primarily for stock removal. Similarly, the cutting member 35 is angled in the opposite direction and the outer ends 39 and 40 act largely as a gauge keeping surface while the angled surface between the outer ends will be used primarily for stock removal. The arrangement of the cutting members is not limited to a V-shape, but it can be an X-shape, L-shape, etc.

The cutting members 34 and 35 will be distributed along the periphery of a core 25a as shown in FIG. 1, and the same advantages discussed above are realized in the flow of coolant and the removal of debris.

FIGS. 7 to 9 of the drawings show another modification of the device shown in FIGS. 1 to 4. The core is designated 25b, and the three cutting members are designated as 41, 42 and 44. In this embodiment of the invention, the member 41 includes a portion 45 at the periphery of the core 25b and a portion 46 of the periphery, of the side of the core. Thus, the member 41 both removes stock with the portion 45 and holds the gauge with the portion 46.

The cutting member 42 is substantially at the periphery of the core 25b at which point normal applied force is used for high pressure stock removal only. Member 44 is the opposite of member 41 and has a portion 45' for stock removal, and a portion 46' for gauge keeping.

It will thus be seen that the cutting members shown in FIGS. 7 to 9 provide three members for stock removal to one gauge keeping member on one side of the core, and one gauge keeping member on the opposite side of the core. Additionally, since maintenance of a proper kerf with square corners is difficult, this device provides a kerf with a rounded bottom. While for some applications such as cutting natural stones, a rounded cutting member does not perform as efficiently as a squared cutting member, the change in efficiency over its cutting life is less noticeable. When the cutting edge is rounded, maintenance of the kerf is easier and long term efficiency is more consistent.

FIGS. 10 to 12 illustrate another variation of the arrangement shown in FIGS. 7 to 9. The core is designated 25c, and the cutting members are designated 48, 49 and 50. Each of the members 48, 49 and 50 is semicircular, but they are oriented differently with respect to the core 25c.

The member 48 is secured at one side of the core 25c, with the straight portion 51 of the semicircle parallel to the side of the core 25c. As a result, one end of the circumference is adjacent to the periphery 52 of the core 25c and will provide some high pressure stock removal, while the central portion of the circumference will act as a low pressure gauge keeping surface.

The member 49 is secured to the periphery 52 of the core 25c with the straight portion 51' of the semicircle perpendicular to the sides of the core 25c. Thus, the center portion of the semicircle will provide for high pressure stock removal while the diametrical ends of the sides 51' will provide the low pressure gauge keeping function.

Finally, member 50 is similar to member 48, but is fixed at the opposite side of the core 25c. The straight side of the semicircle is designated at 51", and its function will be understood from the discussion of member 48.

FIG. 13 of the drawings shows another modification in accordance with the present invention. The device shown in FIG. 13 is similar to that shown in FIGS. 5 and 6. In FIGS. 5 and 6, the cutting members 34 and 35 are placed generally tangentially to the core 25a, then angled to one side or the other on the core. In FIG. 13, the cutting members 54 are placed obliquely, so that members 54 lie along a secant of the core 25d, and are then angled with respect to the secant. As illustrated, successive cutting members 54 are angled in opposite directions so that the leading edge is successively on the right and left sides of the core 25d.

As a result of the placement of the cutting members 54, only an edge of the members will engage the work piece to effect the cutting. As the cutting members wear away, other portions of the members will contact the work piece. Thus, each of the cutting members 54 will work effectively until virtually the entire member has been used. All the while, only a small area of each member 54 will contact the work piece, so power consumption is minimized and the channels for removal of debris are kept open.

Attention in next directed to FIGS. 14 and 15 of the drawings. Both of these figures illustrate saws made by attaching a plurality of cutting members to a flexible cable or the like.

In FIG. 14, there is a flexible cable 55, the cable 55 having spaced there along a plurality of cutting members 56 and 58. All the members 56 and 58 are substantially alike, but the two groups are oriented in opposite directions. The cutting members 56 and 58 are frustoconically shaped, and the members 56 have their bases directed to the left in the drawing, while the members 58 have their bases directed to the right. Such an arrangement will provide equal cutting regardless of the direction of motion of the cable 55. The profiled cutting members 56 and 58 can include cylindrical portions and these cylindrical portions also can be profiled.

An alternative arrangement is shown in FIG. 15. The cable 55a has a plurality of cutting members 56a spaced there along, all the members 56a having their bases directed to the left. The cutting action may therefore be somewhat different, depending on the direction of movement of the cable 55a.

From the above and foregoing description it will be understood that the cutting members 56, 58 and 56a will have at least their surfaces formed of abrasive composite materials which utilizes or contains mesh material. As a result, the members will cut aggressively with minimal loss of hard particles; and, as the cutting edge is worn away, the adjacent area of the surface will come into play as the cutting edge is worn away. This process will continue until the entire cutting member has been used.

FIG. 16 of the drawings shows a piece of material as disclosed in U.S. Pat. No. 5,190,568 the disclosure of which is incorporated herein by reference, the material being designated generally at 59 and having undulations 60. The same material 59A is shown in FIG. 17, but is of flat configuration and shows various shapes to be cut from the material as indicated by broken lines. For example, the cutting members 41, 42 and 44, as shown in FIGS. 7 to 9, are shown in FIG. 17 to illustrate one technique for producing such members. Also, the members 48 and 49 are shown, and members 26 and 28 are shown. The material 59, 59A may be made in accordance with the technique disclosed in any of the previously mentioned U.S. patents or in a manner disclosed by the technique described in my copending patent application Ser. No. 08/225,251 entitled "Method for Making Powder Preform and Abrasive Particles Therefrom," the disclosure of which is incorporated herein by reference. Materials 59 and 59A may be cut by a laser, water jet or the like to provide the cutting members as disclosed herein.

The pieces 57a–d shown in FIGS. 17A–C are similarly cut from the corrugated piece 59 of FIG. 16.

A preferred way of making the material is by sintering it under pressure. Pressure can also be applied prior to heating or during the process of cooling. The ranges of the pressure generally can be chosen between 50 to 500 kg/cm2 but it can be higher or lower depending from the matrix materials and desired thickness of the sintered material. It allows one to make thin laminated abrasive materials having substantial strength. Making the cutting members profiled or corrugated, enhances the strength and stability of these members and also provides the required overall width of the cutting members or tool made from the cutting members.

It should be understood that the material in FIGS. 16 and 17 can comprise a laminated structure wherein at least one layer includes the abrasive particles. Thus, at least one side of the material can comprise a layer having orderly distributed abrasive particles while an inside part of the material can comprise a layer of randomly distributed abrasive particles. The material can also be of alternating combinations of mesh materials and orderly distributed abrasive particles and retaining matrixes with or without randomly distributed abrasive particles and structural members. The structural members are to reinforce and enhance the structural integrity of the cutting members. The structural members can be positioned between or at least on one side of the retaining matrix, abrasive particles and mesh materials and can be of metallic or non-metallic compounds, powders, fibers, meshes, shims, foils and any combinations of them. Generally, the composition of the structural member is different from the composition of the retaining matrix.

By way of example, copper layers can be positioned between layers of cubic boron nitride particles retained by a metallic retaining matrix; these copper layers being sintered together with and as a part of the matrix material. The copper layers can be derived from a powder, fibers, granules, or a powdered preform or can be mesh-type material or prefabricated foil. The metallic retaining matrix can comprise a copper-tin-nickel based composition.

The structural members can also be a bronze or braising material positioned between layers of sintered material. These structural layers are sintered or braised (preferably under pressure) to the sintered abrasive materials. The abrasive material can be cubic boron nitride particles retained by a ceramic based matrix.

Further, by way of example plastic layers can be positioned between layers of the sintered material comprising at least one layer of diamonds retained by a matrix comprising an iron-nickel-copper-tin retaining composition. These plastic layers can be derived from an epoxy, fiberglass, fiber graphite or rubber containing materials, these materials are made by molding together the sintered abrasive materials and the plastic layers.

A preferable embodiment of the disclosed material is a profiled or corrugated multiple layer composite material comprising from one to five layers of sintered abrasive materials (with and/or without backings) separated in this case by relatively low wear resistant (compared to the abrasive material) plastic layers.

Obviously, the geometry of the undulations 60 of the material 59 may have various profiles, shapes, sizes and orientations. Distances between the undulations can be equal or about equal or alternating at least in some portions of this material. These undulations may have other pluralities of undulations, generally smaller, onto them or between them. Further, each side of the material can comprise surfaces of different profiles or a plurality of undulations having different parameters including but not limited to the number, shape, profile, depth, size, or manner of spacing of the undulations.

The distances between layers, especially the abrasive layers, within the material can be equal or about equal or alternating at least in some portions of this material.

It should be further understood that compositions of at least some layers of the material of FIGS. 16 and 17, including but not limited to the plurality of the abrasive particles and retaining matrix and distributing mesh or structural (reinforcing) components, can be the same throughout the material or different.

In FIG. 17A, the cutting member is designated at 57a, and it will be seen that the contoured surface is oriented to be perpendicular to the kerf wall, so the contoured surface is used for stock removal at the bottom of the kerf. The sides of the piece 57a are in a zig-zag path for maintenance of the wall of the kerf and provide the lateral cutting forces at the low pressure cutting faces. The cutting member 57a is fixed to a core 25e by welding or by other known techniques; and, as here shown, a filler is used between the member 57a and the core 25e.

FIG. 17B illustrates a cutting member 57b rotated 90° from the member 57a. Thus, the zig-zag surface of the member effects stock removal at the bottom of the kerf while the contoured surfaces act as lateral cutting forces for gauge keeping. The member 57b is fixed to the core 25f by standard techniques.

The arrangement shown in FIG. 17C is a combination of those shown in FIGS. 17A and 17B in that two pieces 57c and 57d corresponding to 57a and 57b are fixed to the core 25g. The piece 57d is fixed directly to the core 25g similarly to the piece 57b, so the contoured surfaces act as lateral cutting forces for gauge keeping. However, the piece 57c is fixed to the zig-zag surface of the piece 57d, so the contoured surface of the piece 57c engages the bottom of the kerf as high pressure cutting forces are applied normal to the cutting edge to effect stock removal. A filler may be used between the piece 57c and the piece 57d as illustrated. The filler may comprise a plurality of abrasive particles.

It will be understood by those skilled in the art that an assembly such as that shown in FIG. 17C can be separately assembled, and the filler may be sintered, fused, or brazed. Then the assembly is subsequently fixed to the core.

FIG. 18 of the drawings shows a cutting edge of a cutting device. The device shown in FIG. 18 may be the edge of a portion of a band saw or a reciprocating saw, or may represent a straightened edge of a circular saw. The particular configuration of the cutting device is not important. In FIG. 18, there is a core 61 having two undulating cutting members 62 and 64 fixed to the core. As shown in FIG. 18, the cutting members 62 and 64 include arcuate portions 65 connected by straight portions 66. The arcuate portions 65 have their ends fixed to the core 61, and the arc extends out beyond the core itself. The straight portions connect the ends of the arcuate portions 65, and provide additional abrasive material to assist in high pressure stock removal. Straight portions 66 may also have an arcuate shape.

Straight portions 66 may be in a line as shown or staggered relative to each other.

The arcuate portions 65 may be formed as discussed above, the portions 65 being shown in FIG. 17 by way of illustration. It is to be understood that the edge portions of 65 and 66 shown in FIG. 18 will act as cutting edges normal to the work piece, for high pressure stock removal, while the curved sides of portions 65 will act as low pressure, gauge keeping surfaces. Straight portions 66 may also have an arcuate shape.

FIG. 19 illustrates a cutting member similar to that shown in FIG. 11, but the cutting member shown in FIG. 19 is adapted to be made for ease in subsequently mounting to a core. As illustrated, the cutting member 68 is fixed to a mounting member 69. The mounting member 69 is U-shaped to fit over a core 70, though it will be understood that numerous other shapes can be used. As here shown, the mounting member 69 can be easily attached to the core 70 by tack welds, including welds made by laser.

Figure 20:
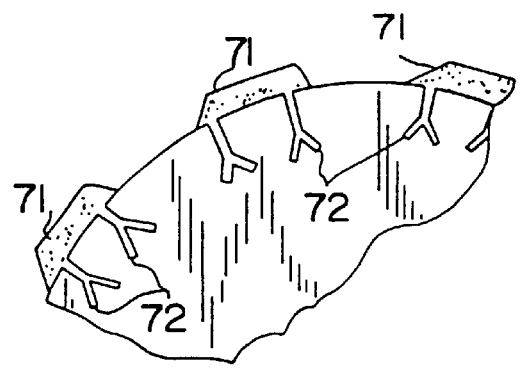
FIG. 20 is a fragmentary view showing a plurality of cutting members made in accordance with the present invention and subsequently molded into a core.

FIG. 20 shows a modification of the arrangement shown in FIG. 19. In FIG. 20, there are cutting members 71 formed in one of the ways discussed in the above-identified patents, the members 71 being formed with anchors 72 integral therewith. The core 74 may be a resinous material or composite material, or metal, so long as the segments 71 are not damaged by the molding process.

Figure 21A:
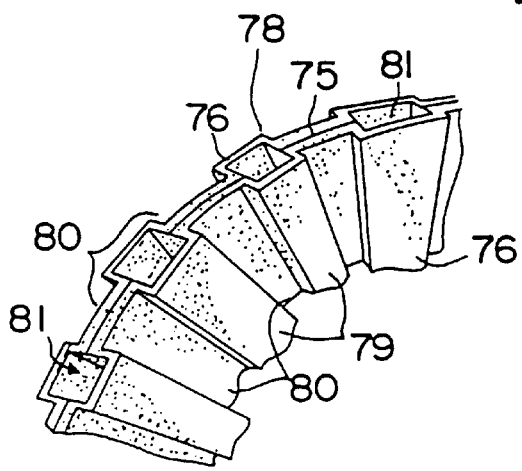
FIG. 21A is a fragmentary perspective view showing a composite, structurally independent rotary saw cutting tool.
Figure 21:
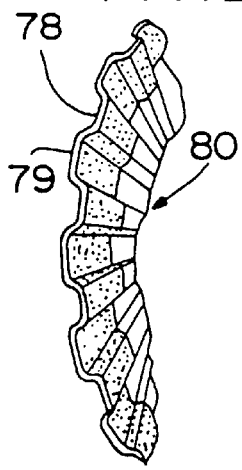
FIG. 21 is a fragmentary perspective view showing a modified form of a composite, structurally independent rotary saw cutting tool, wherein the abrasive material and core are integral, and made in accordance with the present invention, and corresponds to FIG. 15 of U.S. Pat. No. 5,190,568.

FIG. 21 of the drawings shows a fragmentary perspective view of a modified form of the composite, structurally independent rotary saw cutting tool and corresponds to the saw blade of FIG. 15 of U.S. Pat. No. 5,190,568. In FIG. 21, the contour of the surface is lateral rather than vertical (or radial). The zig-zag nature of the cutting surfaces 78 will allow radially directed flow of coolant and removal of debris through valleys 80. The sides 79 of the tool act as the low pressure cutting forces and apply lateral cutting forces to the cut in the work piece. The abrasive particles can extend as far into the blade radially as may be desired, thus avoiding the use of an independent core to which this cutting member is fixed.

The cutting tool shown in FIG. 21 is derived from a plate similar to that shown in FIG. 16 to provide a profile having the required undulations. To provide the cutting tool with abrasive particles only in the peripheral rim area as shown in FIG. 21, the abrasive particles should be properly positioned within the plate. The abrasive rim and the composite core portion of the tool may have the same or a different plurality of undulations, including not having the undulations at all in at least some portions of the core.

FIG. 21A shows a fragmentary portion of a circular saw blade in which two of the structures shown in FIG. 21 are combined, but the configuration is not limited to circular saws. The device in FIG. 21A is formed by placing two pieces of corrugated material shown in FIG. 21 together, and the result is a central, discontinuous web 75 with interspersed tubular members 76. From the above discussion, it will be realized that this configuration provides high pressure stock removal cutting along the edges 78, while the sides 79 of the tubular members 76 act as low pressure gauge keeping cutting surfaces. Further, debris can be removed in the valleys 80 between the tubular members 76 as well as through the openings 81 in the tubular members 76. Coolants and/or lubricants can also be supplied through the openings 81. It should be recognized that due to the independent structural integrity of the mesh material, the configuration shown in FIG. 21A does not necessarily depend on a core made of a material other than the mesh material itself.

The structure illustrated in FIG. 21A is further usable as a grinding member. The sides 79 of the tubular members 76 can also act as the high pressure stock removal portion of the device, the discontinuous web 75 can act as the low pressure gage keeping portion of the device, while the valleys 80 allow removal of debris. The shape of the device when used as a grinding device may be broadly varied and, whether used as a cutting or grinding device, the tubular members 76 may be generally rectangular as shown, or may be round, elliptical or polygonal.

As noted, a plurality of composite, structurally independent cutting members, such as illustrated in FIG. 21 can be put together in such a way as to provide tools with difficult configurations, or to provide greater thickness to the tool. In FIG. 21A, honeycomb-like structures of abrasive materials are formed. This structure can be formed by direct manufacture, or by manufacturing contoured parts, such as shown in FIG. 21, and subsequently assembling the parts by brazing, fusing, gluing or welding. The welding can include laser and electron beam welding as well as the more conventional techniques. The resulting structures can be used in grinding wheels, routers, reamers, drills and the like. A honeycomb surface may perform stock removal and/or gauge keeping functions. The openings 81 can be used to deliver coolants, lubricants or surface-active materials, such as neutral or reducing gas to the working zone. Further, the openings 81, and/or valleys 80, can be filled with a variety of materials, including solids, porous or powdered materials, pastes and plastic materials, fabrics, advanced composite materials and the like, and combinations of any of such materials. The materials can function as a lubricant (e.g. molybdenum disilicide, graphite, glass), as a carrier for a lubricant, or other medium to be delivered to the working zone, and as a reinforcement of the honeycomb structure.

Figure 22:
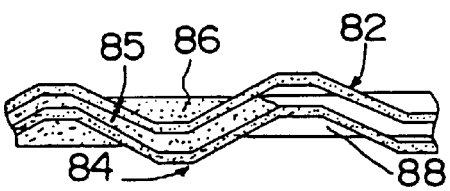
FIGS. 22 and 23 are fragmentary views similar to FIG. 18 and showing a different modification thereof.

FIG. 22 illustrates a variation of the arrangement shown in FIG. 18. In FIG. 22, the cutting members 82 and 84 are formed of straight segments, but the general configuration is the same as in, FIG. 18. While FIG. 18 shows bulges, here the arcuate shapes have domes. Additionally, there is a filler 85 between the two cutting members 82 and 84. There may also be a filler 86 in the valleys of the cutting members, fixed to the core 88. The fillers 85 and 86 are partially broken away to show the core 88. The fillers can comprise abrasive particles of the same or different nature, size Land concentrations as in cutting members 82 and 84. The member 84 may comprise a round shape or be eliminated entirely, allowing member 82 to form a contoured surface without flat parts. It should also be recognized that FIG. 22 relies upon a separate core material on which to construct a multilayered mesh-configured tool having a filler of a different material there between.

Figure 23:
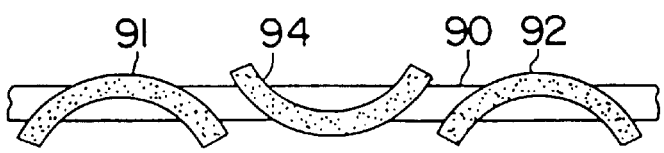

FIG. 23 illustrates a cutting member that is also a variation of the arrangement shown in FIG. 18, or FIG. 22. In FIG. 23, the individual shapes to form the cutting member are as shown at 65 in FIG. 17; however, here in FIG. 23 the pieces are substantially centered on the core. The core in FIG. 23 is designated 90, and the cutting members are designated 91, 92 and 94. Whereas the pieces 65 in FIG. 18 have their ends on the core and the arcuate portions extending beyond the sides of the core, the pieces 91, 92 and 94 are substantially centered on the core 90, with the ends at one side of the core 90, and the arcuate portion at the other side of the core 90. Further, successive pieces are reversed with respect to the immediately preceding piece. Thus, the members 91 and 92 have their ends at one side of the core 90, while the member 94 has its ends at the opposite side of the core 90. It should be understood that the ends of members 94 can be positioned with members 91 and 92 or the pieces can be positioned so that only the bulges protrude over the side of the core.

It will therefore be understood that the arrangement shown in FIG. 23 provides, effectively, a zig-zag pattern on the stock removal surface of the cutting member, though the zig-zag pattern is discontinuous. While the specific features are different, the general operation is substantially the same as for the devices shown in FIGS. 18 and 22. In all cases, there is a zig-zag pattern for stock removal and a contoured surface for gauge keeping.

An important purpose of the profiling or corrugation of the abrasive members or tool is the elimination, or at least the retardation of the development, of straight along the direction of the cut wear grooves between the abrasive layers. Such grooves, if developed, can slow down the rate of cut and can reduce the useful life of the tool.

Figure 24:
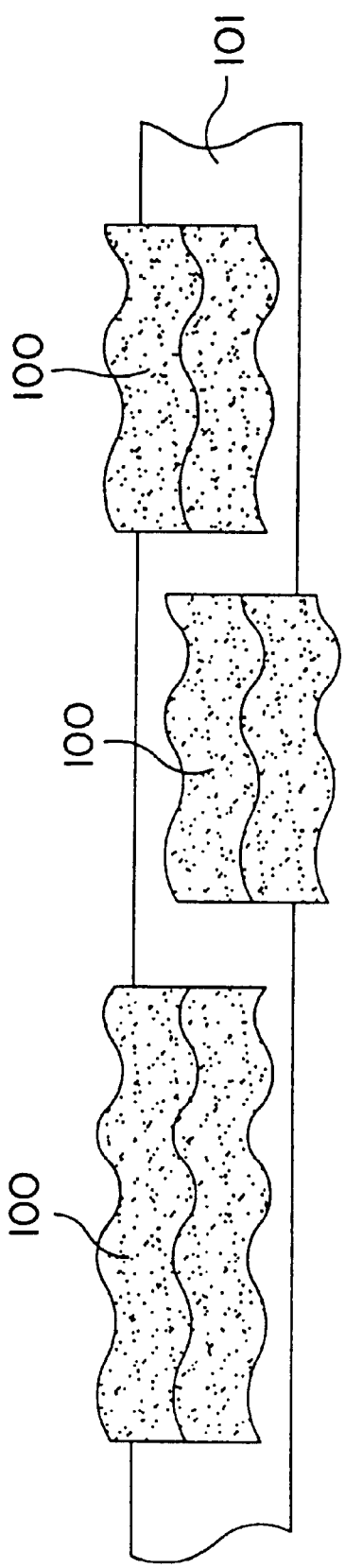
FIGS. 24 and 25 are fragmentary views showing alternative arrangements for fixing the cutting members to a core to avoid straight wear grooves.

Another purpose of the profiling or corrugating is a reduction of the concentration of the abrasive particles per the abrasive member. A thin laminated abrasive member that derives from the material 59 has a high content of abrasive particles, but taking into consideration the thickness of the blade that this profiled abrasive member covers, one can see that this content per the blade thickness is substantially diminished. This purpose of breaking the straight wear grooves along the direction of the cut can also be achieved by several other designs of the material 59 or alignment of the abrasive members on the tool carrier. For example, and as shown in FIG. 24, a plurality of the abrasive members 100 mounted on a core 101 may have the same thickness and profile and be made of a plurality of layers with the portion of the abrasive layers in each being staggered due to an offset of the abrasive members relative to each other on the core or tool carrier.

Alternatively, the thicknesses of the members may vary to achieve the same effect.

Figure 25:
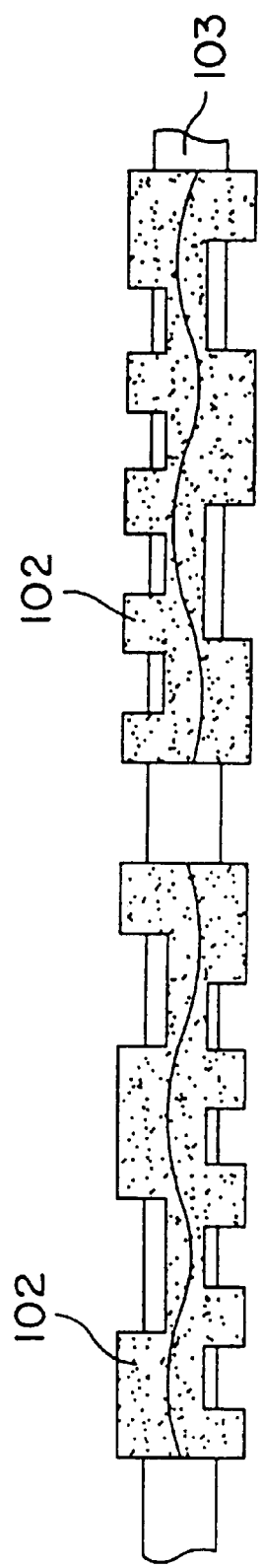

Also the abrasive members 102 may have different profiles or ,corrugations on each side surface of the core 103 of the abrasive member as shown in FIG. 25. These abrasive members can be mounted on the core in such alternating manner that each next abrasive member has the side surface of the same type of the profile oriented towards a different side surface of the tool carrier. Obviously many variations can be made in the construction and/or arrangement of the cutting members to avoid straight wear grooves.

The individual abrasive particles used in this invention may be selected from those commonly used in the abrasive art, however, the abrasive particles (size and composition) will be chosen with the application of the abrasive article in mind. In choosing an appropriate abrasive particle, characteristics such as hardness, compatibility with the intended workpiece, particle size, reactivity with the workpiece, as well as heat conductivity may be considered.

The composition of abrasive particles useful in the invention can be divided into two classes: natural abrasives and manufactured abrasives. Examples of natural abrasives include: diamond, corundum, emery, garnet, buhrstone, chert, quartz, sandstone, chalcedony, flint, quartzite, silica, feldspar, pumice and talc. Examples of manufactured abrasives include: boron carbide, cubic boron nitride, fused alumina, ceramic aluminum oxide, heat treated aluminum oxide, alumina zirconia, glass, silicon carbide, iron oxides, tantalum carbide, cerium oxide, tin oxide, titanium carbide, synthetic diamond, manganese dioxide, zirconium oxide, and silicon nitride.

Abrasive particles useful in the invention typically and preferably have a particle size ranging from about 0.1 micrometer to about 1500 micrometers, more preferably ranging from about 0.1 micrometer to about 1300 micrometers. The abrasive particles preferably have an average particle size ranging from about 0.1 micrometer to about 700 micrometers, more preferably ranging from about 1 to about 150 micrometers, particularly preferable from about 1 to about 80 micrometers. It is preferred that abrasive particles used in the invention have a Moh's hardness of at least 8, more preferably above 9; however, for specific applications, softer particles may be used.

The term "abrasive particle" includes agglomerates of individual abrasive particles. An abrasive agglomerate is formed when a plurality of abrasive particles are bonded together with a binder to form a larger abrasive particle which may have a specific particulate structure. The plurality of particles which form the abrasive agglomerate may comprise more that one type of abrasive particle, and the binder used may be the same as or different from the binders used to bind the agglomerate to a backing.

The retaining matrixes for the abrasive particles of the materials 59 and 59A can be made from a variety of compositions. The choice of the compositions depends upon the application of the tool. The following are examples of some retaining compositions wherein the weight ratio between the components is shown by percentage.

EXAMPLE 1

Cobalt (2–99%), Iron (20–50%), Copper (2–95%), Tin (0.5–30%) Zinc (0.5–15%), Nickel (1–99%), Manganese (2–15%), Boron (0.2–4%), Silica (0.2–4%), Phosphorus (0.2–10%), Chromium or other carbide forming elements or compositions (0.2–30%), Selenium (0.2–2%), Cadmium (0.2–30%), Aluminum (0.2–8%), Tungsten and other Carbides (5–70%), Chromium Boride (1–20%), Silver (0.5–65%), Tungsten (2–25%), Molybdenum (2–30%).

EXAMPLE 2

Cobalt (40–50%), Copper (10–15%), Iron (10–15%), Nickel (8–20%), Tin (0.5–4%), Chromium (2–10%), Boron (0.5–2%), Silica (0.5–3%), Tungsten Carbide (5–40%).

EXAMPLE 3

A mixture of so-called diamond setting powders #11 or #50, manufactured by Wall Colmonoy Corporation (Madison Heights, Mich.) with a Cobalt powder. A ratio between Wall Colmonoy's powders and Cobalt powder can vary from 10:90 and 90:10.

Examples of braising and fusing materials that can be used as additives with the above retaining compositions or by themselves as the retaining compositions are as follows:

EXAMPLE 4

Silver 45%, Cu 15%, Zn 16%, Cd 24% (Grade "Easy Flow 45" manufactured by Lucas-Milhaupt, Inc.)

EXAMPLE 5
Copper Manganese—Tin Braising Alloys
Copper (65–82%), Manganese (3–15%), Tin (10–15%) with or without Selenium and Nickel as additives (re: "A study of Some Cu-Mn-Sn Braising Alloys" Welding Research Supplement, May 1991, pp. 118s–121s by S. K. Chatterjee, Z. Mingxi and A. C. Chilton).

EXAMPLE 6

Chromium (4–25%), Copper (0–65%), Phosphorus (0–10%), Silica (0–4%), Boron (0–4%), Ni and/or Cobalt-balance.

The fillers useful in the invention are typically inorganic particulate matter which comprise materials which are substantially inert or non-reactive with respect to the grinding surface acted upon by the abrasive. Occasionally, however, active (i.e., reactive) fillers are used, sometimes referred to in the abrasive art as grinding aids. These fillers interact beneficially with the grinding surface during use. In particular, it is believed in the art that the grinding aid may either 1) decrease the friction between the abrasive particles and the workpiece being abraded, 2) prevent the abrasive particle from "capping", i.e., prevent metal particles from becoming welded to the tops of the abrasive particles, 3) decrease the interface temperature between the abrasive particles and the workpiece, or 4) decrease the required grinding force.

Grinding aids encompass a wide variety of different materials and can be inorganic or organic based. Examples of chemical groups of grinding aids useful in this invention include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronapthalene; and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite and metallic sulfides. It is also within the scope of this invention to use a combination of different grinding aids and in some instances this may produce a synergistic effect. The above mentioned examples of grinding aids is meant to be a representative showing of grinding aids, and it is not meant to encompass all grinding aids.

Grinding aids are preferably used in slurries and binder precursor dispersions of the invention in amounts ranging from about 0.1 to about 10 dry weight percent, more preferably from about 0.5 to about 5.0 weight percent, based on total weight of binder precursor solution. If non-reactive fillers are employed they may used up to 50 dry weight percent.

As stated previously, the addition of a filler typically increases the hardness and toughness of the cured binder. The filler is typically and preferably an inorganic particulate having an average particle size ranging from about 1 micrometer to about 100 micrometers, preferably from about 5 to about 50 micrometers, and most preferably from about 10 to 25 micrometers. Moreover, the filler will preferably have a specific gravity in the range of 1.5 to 4.50, and the average particle size of the filler will preferably be less than the average particle size of the abrasive particles.

Examples of useful non-reactive fillers for this invention include: metal carbonates such as calcium carbonate (in the form of chalk, calcite, marl, travertine, marble or limestone), calcium magnesium carbonate, sodium carbonate, and magnesium carbonate; silicas such as quartz, glass beads, glass bubbles and glass fibers; silicates such as talc, clays, feldspar, mica, calcium silicate, calcium metasilicate, sodium aluminosilicate, and sodium silicate; metal sulfates such as calcium sulfate, barium sulfate, sodium sulfate, aluminum sodium sulfate, and aluminum sulfate; gypsum; vermiculite; wood flour; aluminum trihydrate; carbon black; metal oxides such as calcium oxide (lime), aluminum oxide, titanium dioxide; alumina hydrate, alumina monohydrate; and metal sulfites such as calcium sulfite.

By way of Example, a 14" diameter segmented blade of the type, shown in FIG. 17B or 23 is made in which each segment comprises a laminated material of three layers of diamonds (35/40 mesh) that were placed within the openings of a steel woven wire of 40 mesh and retained in an iron-copper-tin based retaining matrix. The material for the segments was made in the form of plate as shown in FIG. 16 and was sintered under pressure, then cut into segments by a laser and braised or laser welded onto the core. One or both side surfaces of the profiled segments comprise rhombus shape undulations. These undulations were made by the technique described in co-pending patent application Ser. No. 08/225,251 by pressing or indenting an expanded steel onto segment material through the separator (in this case graphite paper) in the process of sintering under pressure. The thickness of the laminated material is 1.6 mm, overall width of the profiled segments is 2.00 mm, overall width of the blade (due to the deliberate offset of the segments in the process of mounting them on the core) is 2.3 mm, length of the segments is 19.2 mm, thickness of the steel core is 1.6 mm, 22 lands per the core, and two segments per land. These blades provide a thin kerf cut and easy cutting performance while cutting a variety of stones, ceramics, and concretes.

In addition, a 4" diameter composite cutoff blade as shown in general in FIG. 21A is made comprising three layers of laminated material of 40 mesh stainless steel for distributing diamonds within the opening of this mesh and at the same time reinforcing the structure of the blade; diamonds of 40/50 mesh positioned within ½" wide peripheral rim; retaining matrix;

iron-copper-cobalt-nickel powdered composition. The diamond rim is slightly thicker than the core portion of the blade; 1.7 mm and 1.5 mm. Both side surfaces of the blade carry the same plurality of undulations on the rim and on the core. This blade provides a thin kerf cut and easy cutting performance while cutting a variety of concretes and stones.

Alternative designs of cutting and grinding member elements wherein the contoured surfaces provide stock removal and gauge keeping functions, and which form channels to permit delivery to and removal of debris away from the work area may be utilized wherein the cutting element profiles exhibit the desired characteristics of having high pressure and low pressure cutting forces to correspond, respectively, to applied normal and lateral cutting forces, in place of or in addition to the cutting element profiles described in FIGS. 1 to 23.

The cutting or grinding member elements of the present invention may be attached to the core in a manner to provide effective and efficient cutting of the work material being cut or ground. These elements may be formed using mesh material independently of the separate core material, cut to shape and then applied to the core. Further, these cutting and grinding member elements may be used to form abrasive cutting and grinding member elements and tools that are structurally independent of a separate core material. These elements may be constructed of single or multiple abrasive layers, and which may include laminated reinforcing materials on the outer edge or edges of the cutting member element.

The present invention provides abrasive cutting and grinding member elements and tools that provide a substantial improvement over prior art abrasive technology in terms of reducing feed force, increasing cutting speed, reduction of power consumption and increased cutting life through full utilization of diamonds or other high value abrasive particles. Further, these improvements may be made with the added benefits of cost reduction and improvement in user safety.

There are many advantages of using the thin profiled laminated abrasive members of the present invention. Among these advantages are thin cut of the kerf, less volume of the workpiece needed to be removed in the process of the cut, less dust generated while cutting the workpiece, less power required to make the cut, and the ability to use less powerful cutting and grinding machines. Another advantage of the thin laminated abrasive material is the minimum amount of the retaining matrix required to make these tools (up to hundreds time less vs. conventional sintered tools). This reduction of the amount of the retaining matrix results in a reduction of amount of dust or other airborne particles in the process of usage or wearing of the abrasive tool.

Another important advantage, from the standpoint of costs, is the small amount of structural and/or retaining matrix required to make these members and the tight positioning of abrasive layers within these abrasive members. It is well known that effective machining of different types of workpieces even within one group of the materials (e.g., concrete or natural stone) requires the specific retaining matrix for practically every type of material to be cut. This is because of the necessity of letting the retaining matrix be worn out by the workpiece to remove dull and broken abrasive particles from the matrix and open new abrasive particles. Here, however, due to the minimal amount of the matrix between the layers or within the layers, the wear characteristics of the matrixes become less relevant for the performance of the tool. It allows the disclosed tools to be used in a more universal way. Thus tools comprising the same matrixes can be used for machining a variety of materials, e.g., groups of concretes or stones of substantially different hardness, wear characteristics, and structures. As a result, the variety of specifications on the matrixes or tools is reduced because the same type of the tool can be used for machining a wider group of materials, resulting in utilization of the tools by a wider group of users. Such a "universal" tool is suitable not only by the professional market, but by the consumer wherein an ability to machine a large number of materials with the same tool is greatly appreciated.

It should be noted that in case of making deeply profiled abrasive members or tools, the mesh-type materials (ones that are used for distributing the abrasive particles or the ones that are used for reinforcing the structure), may have to be properly profiled or deformed in advance. Such profiling should be done prior to assembling with or without the powdered components or the sintering. Pre-profiled mesh materials or assemblies are also utilized in making encapsulated profiled cutting members. Such profiled cutting element is encapsulated within a rectangular segment. Space between the profiled cutting element and the periphery of circumscribing segment can be filled with a material of relatively lower wear resistant characteristics. Such encapsulation results in increasing strength of the abrasive member. In the process of dressing or cutting this filled material will be worn out opening the profiled cutting member.

It will be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

What is claimed is:

1. A cutting tool comprising a core, a working edge of said core and a plurality of cutting members structurally independent of said core and shaped to be fixed to said core, each of said cutting members being cut out from a corrugated sheet of an abrasive material comprising a sintered retaining matrix material having a plurality of abrasive particles embedded therein, said particles including agglomerates of individual abrasive particles and being orderly distributed in a non-random pattern in the matrix material by means of a mesh material, and each of said cutting members being fixed to and arranged along said working edge of said core for engaging a workpiece and cutting a kerf therein having a bottom and opposed sides, said core having first and second sides extending perpendicular to and on either side of said edge, each of said cutting members having at least a portion extending beyond at least one of said first and second sides of said core in a direction normal thereto and being fixed to said core so that the members engage opposed sides of the kerf and act as gauge keeping members, said cutting members further including a stock removal portion for engaging the bottom of said kerf, said cutting members being fixed to said core so that the stock removal portion of said members has a width extending along the working edge of said core, the effective total width of said stock removal portion of the cutting members being substantially equal to the width of said kerf.

2. The cutting tool of claim 1, wherein each of said cutting members has a first portion extending beyond the first side of said core in a direction normal thereto and a second portion extending beyond the second side of said core for engaging the opposed sides of the kerf and acting as gauge keeping members, said cutting members further including a stock removal portion between said first and second portions for engaging the bottom of said kerf, said stock removal portion having a width extending along the working edge of said core, the effective total width of said stock removal portion of the cutting members being substantially equal to the width of said kerf.

3. The cutting tool of claim 2, including a plurality of first and second portions in each cutting member, wherein said plurality of first portions define first channels therebetween, and said plurality of second portions define second channels therebetween.

4. The cutting tool of claim 1, including a pair of members extending generally parallel to each other which together provide said portions for each cutting member, and further including a filler between said pair of members.

5. The cutting tool of claim 1, wherein said stock removal portion has a zig-zag configuration to provide said effective total width.

6. The cutting tool of claim 1, wherein the mesh material is incorporated in said sheet of abrasive material and is a part of said cutting members.

7. The cutting tool of claim 1, wherein said abrasive particles are selected from the group consisting of diamond, corundum, emery, garnet, buhrstone, chert, quartz, sandstone, chalcedony, flint, quartzite, silica, feldspar, pumice, talc, boron carbide, cubic boron nitride, fused alumina, ceramic aluminum oxide, heat treated aluminum oxide, alumina zirconia, glass, silicon carbide, iron oxide, tantalum carbide, cerium oxide, tin oxide, titanium carbide, synthetic diamond, manganese dioxide, zirconium oxide, and silicon nitride.

8. The cutting tool of claim 1, wherein said abrasive particles have a particle size of from about 0.1 to about 1500 micrometers.

9. The cutting tool of claim 1, wherein said particles have an average particle size of from about 0.1 to about 700 micrometers.

10. The cutting tool of claim 9, wherein the average particle size is from about 1 to about 150 micrometers.

11. The cutting tool of claim 10, wherein the average particle size is from about 1 to 80 micrometers.

12. The cutting tool of claim 1, wherein said abrasive particles have a Moh hardness of at least 8.

13. The cutting tool of claim 12, wherein said abrasive particles have a Moh hardness above 9.

14. The cutting tool of claim 1, wherein the agglomerates include at least two different types of abrasive particles.

15. The cutting tool of claim 1, wherein said sintered retaining matrix material comprises a braising or fusing material.

16. The cutting tool of claim 1, wherein said sintered retaining matrix material includes at least one braising or fusing material as an additive.

17. The cutting tool of claim 15 or 16, wherein the braising or fusing material comprises a composition of 45% silver, 15% copper, 16% zinc, and 24% cadmium.

18. The cutting tool of claim 15 or 16, wherein the braising or fusing material comprises a composition of 65 to 82% copper, 3 to 15% manganese and 10 to 15% tin and optionally selenium and/or nickel as additives.

19. The cutting tool of claim 15 or 16, wherein the braising or fusing material comprises a composition of 4 to 25% chromium, 0–65% copper, 0–10% phosphorous, 0–4% boran, and the balance nickel and/or cobalt.

20. A cutting tool comprising a core, a working edge of said core and a plurality of cutting members structurally independent of said core and shaped to be fixed to said core, each of said cutting members being cut out from a corrugated sheet of an abrasive material comprising a sintered retaining matrix of a braising or fusing material having a plurality of abrasive particles embedded therein, said particles being orderly distributed in a non-random pattern in the matrix material by means of a mesh material, and each of said cutting members being fixed to and arranged along said working edge of said core for engaging a workpiece and cutting a kerf therein having a bottom and opposed sides, said core having first and second sides extending perpendicular to and on either side of said edge, each of said cutting members having at least a portion extending beyond at least one of said first and second sides of said core in a direction normal thereto and being fixed to said core so that the members engage opposed sides of the kerf and act as gauge keeping members, said cutting members further including a stock removal portion for engaging the bottom of said kerf, said cutting members being fixed to said core so that the stock removal portion of said members has a width extending along the working edge of said core, the effective total width of said stock removal portion of the cutting members being substantially equal to the width of said kerf.

21. A cutting tool comprising a core, a working edge of said core and a plurality of cutting members structurally independent of said core and shaped to be fixed to said core, each of said cutting members being cut out from a corrugated sheet of an abrasive material comprising a sintered retaining matrix material including at least one braising or fusing material as an additive thereof having a plurality of abrasive particles embedded therein, said particles being orderly distributed in a non-random pattern in the matrix material by means of a mesh material, and each of said cutting members being fixed to and arranged along said working edge of said core for engaging a workpiece and cutting a kerf therein having a bottom and opposed sides, said core having first and second sides extending perpendicular to and on either side of said edge, each of said cutting members having at least a portion extending beyond at least one of said first and second sides of said core in a direction normal thereto and being fixed to said core so that the members engage opposed sides of the kerf and act as gauge keeping members, said cutting members further including a stock removal portion for engaging the bottom of said kerf, said cutting members being fixed to said core so that the stock removal portion of said members has a width extending along the working edge of said core, the effective total width of said stock removal portion of the cutting members being substantially equal to the width of said kerf.

22. The cutting tool of claim 20 or 21, wherein each of said cutting members has a first portion extending beyond the first side of said core in a direction normal thereto and a second portion extending beyond the second side of said core for engaging the opposed sides of the kerf and acting as gauge keeping members, said cutting members further including a stock removal portion between said first and second portions for engaging the bottom of said kerf, said stock removal portion having a width extending along the working edge of said core, the effective total width of said stock removal portion of the cutting members being substantially equal to the width of said kerf.

23. The cutting tool of claim 22, including a plurality of first and second portions in each cutting member, wherein said plurality of first portions define first channels therebetween, and said plurality of second portions define second channels therebetween.

24. The cutting tool of claim 20 or 21, including a pair of members extending generally parallel to each other which together provide said portions for each cutting member, and further including a filler between said pair of members.

25. The cutting tool of claim 20 or 21, wherein said stock removal portion has a zig-zag configuration to provide said effective total width.

26. The cutting tool of claim 20 or 21, wherein the mesh material is incorporated in said sheet of abrasive material and is a part of said cutting members.

27. The cutting tool of claim 20 or 21, wherein the braising or fusing material comprises a composition of 45% silver, 15% copper, 16% zinc, and 24% cadmium.

28. The cutting tool of claim 20 or 21, wherein the braising or fusing material comprises a composition of 65 to 82% copper, 3 to 15% manganese and 10 to 15% tin and optionally selenium and/or nickel as additives.

29. The cutting tool of claim 20 or 21, wherein the braising or fusing material comprises a composition of 4 to 25% chromium, 0–65% copper, 0–10% phosphorous, 0–4% boran, and the balance nickel and/or cobalt.

* * * * *